Jan. 9, 1923.
H. M. HOWELL.
WHEEL FOR AUTOMOBILES.
FILED OCT. 6, 1921.
1,441,424.
3 SHEETS—SHEET 1.
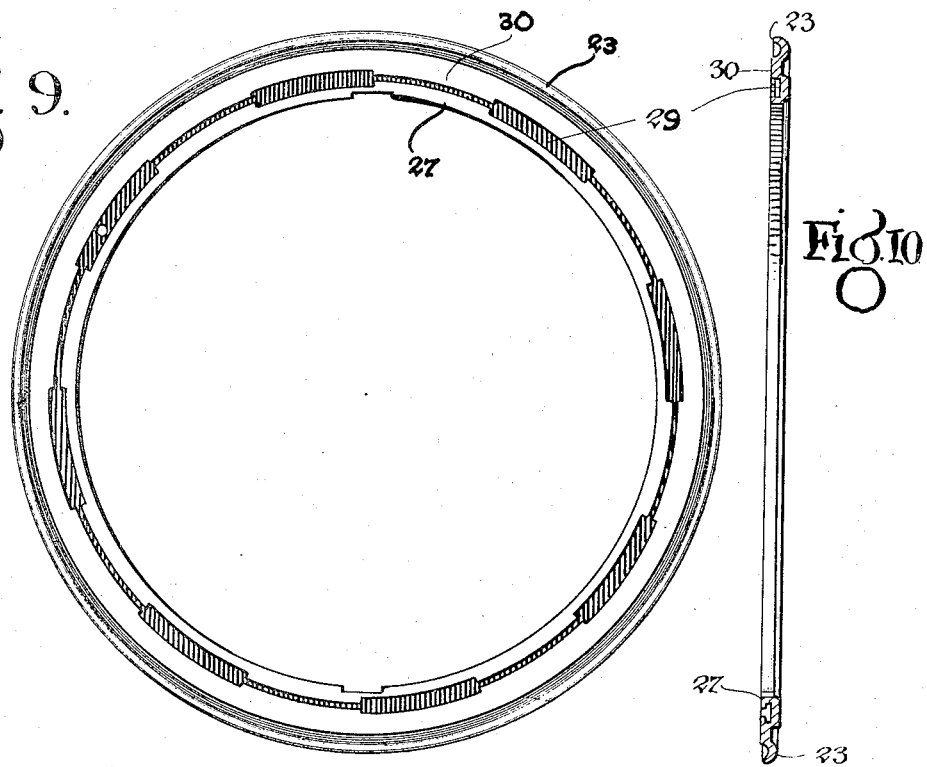
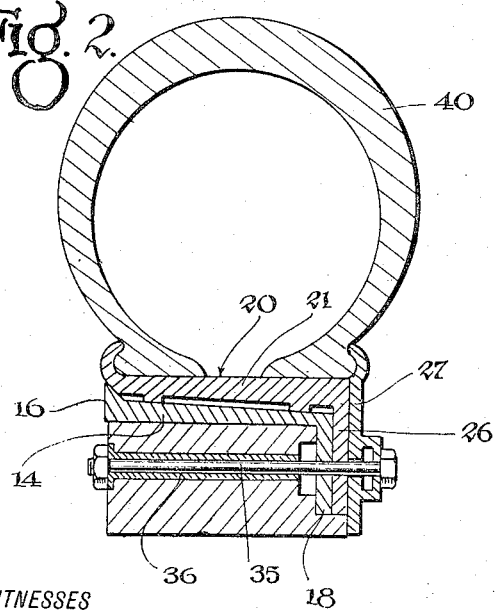
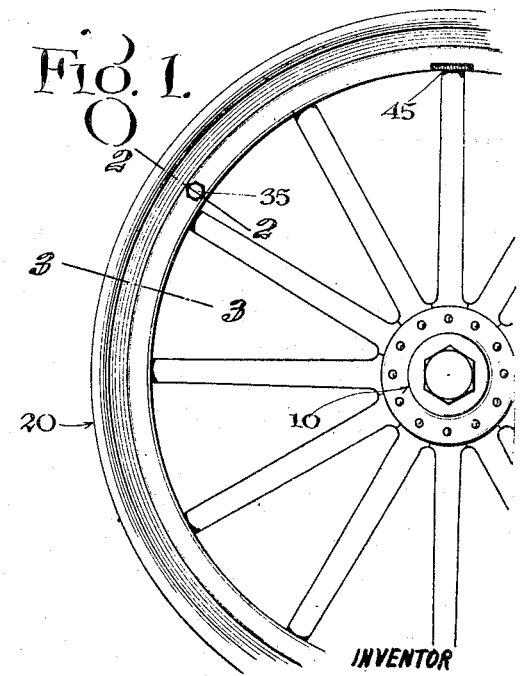
INVENTOR
HENRY M. HOWELL.
ATTORNEYS Jan. 9, 1923.
H. M. HOWELL.
WHEEL FOR AUTOMOBILES.
FILED OCT. 6, 1921.
1,441,424.
3 SHEETS—SHEET 2.
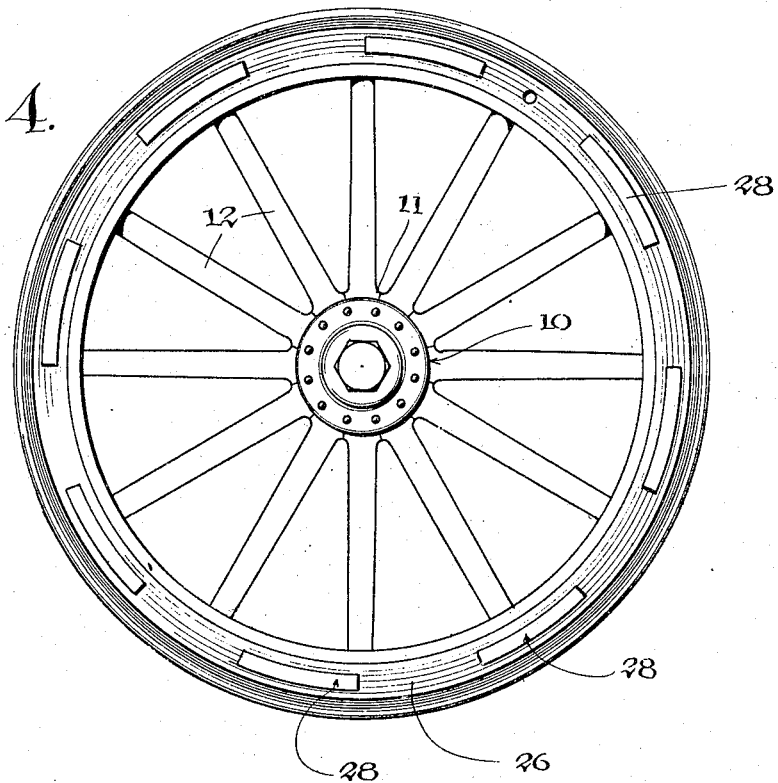
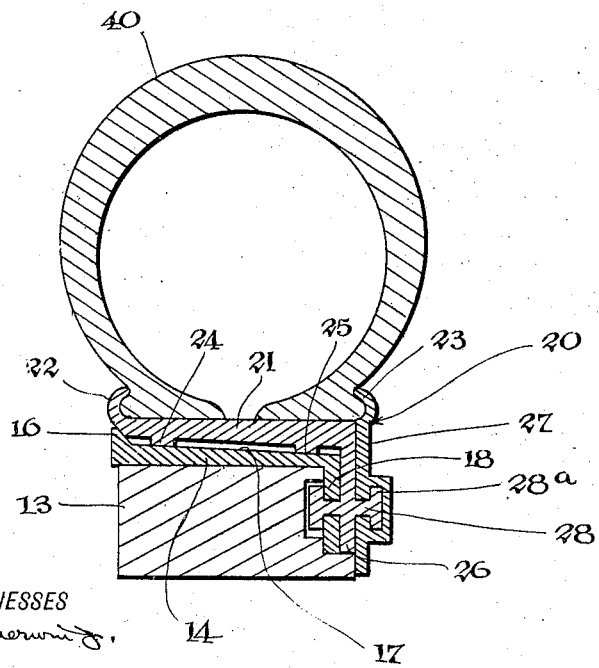
INVENTOR
HENRY M. HOWELL.
ATTORNEYS

INVENTOR
HENRY M. HOWELL.

Patented Jan. 9, 1923.

1,441,424

UNITED STATES PATENT OFFICE.

HENRY M. HOWELL, OF MONROE, LOUISIANA.

WHEEL FOR AUTOMOBILES.

Application filed October 6, 1921. Serial No. 505,840.

*To all whom it may concern:*

Be it known that I, HENRY M. HOWELL, a citizen of the United States, and a resident of Monroe, in the parish of Ouachita and State of Louisiana, have invented certain new and useful Improvements in Wheels for Automobiles, of which the following is a specification.

This invention relates in general to wheels for automobiles or the like of the type embodying a demountable rim.

The object of the invention is to provide a wheel of this character in which the demountable rim may be readily and easily assembled with or disassembled from the wheel; in which the demountable rim permits of the removal or replacement of a tire thereon without the necessity of pinching the tire over the tire retaining flange; in which the demountable rim is securely locked and effectively supported in assembled position on the wheel; and which is in general of simple and durable construction, reliable in operation and easy and inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a fragmentary view in side elevation illustrating the preferred embodiment of the invention;

Figure 2 is a view in transverse section on line 2—2 of Figure 1;

Figure 3 is a similar view, on line 3—3 of Figure 1;

Figure 4 is a view in side elevation with the outer tire retaining flange removed;

Figure 9 is a view in side elevation of the inside of the outer retaining flange; and Figure 10 is a view thereof in transverse section.

Figure 5:
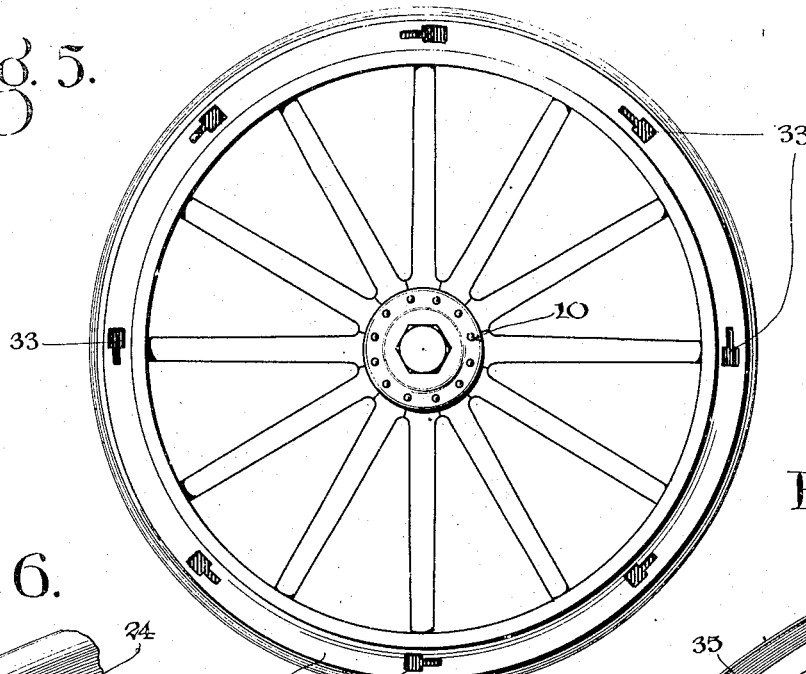
Figure 5 is a view in side elevation with the demountable rim removed.
Figure 6:
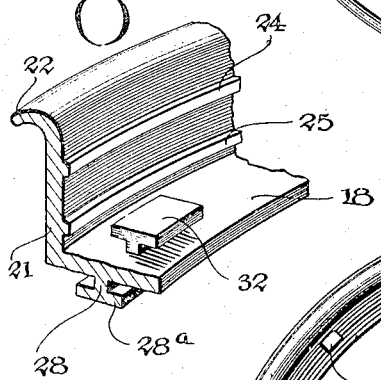
Figure 6 is a view in fragmentary perspective of the demountable rim, the rim being turned at 90° for the sake of illustration.
Figure 7:
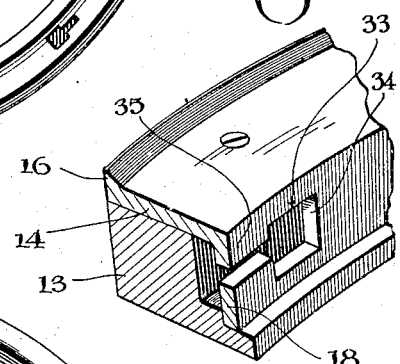
Figure 7 is a fragmentary view in perspective of the wheel.
Figure 8:
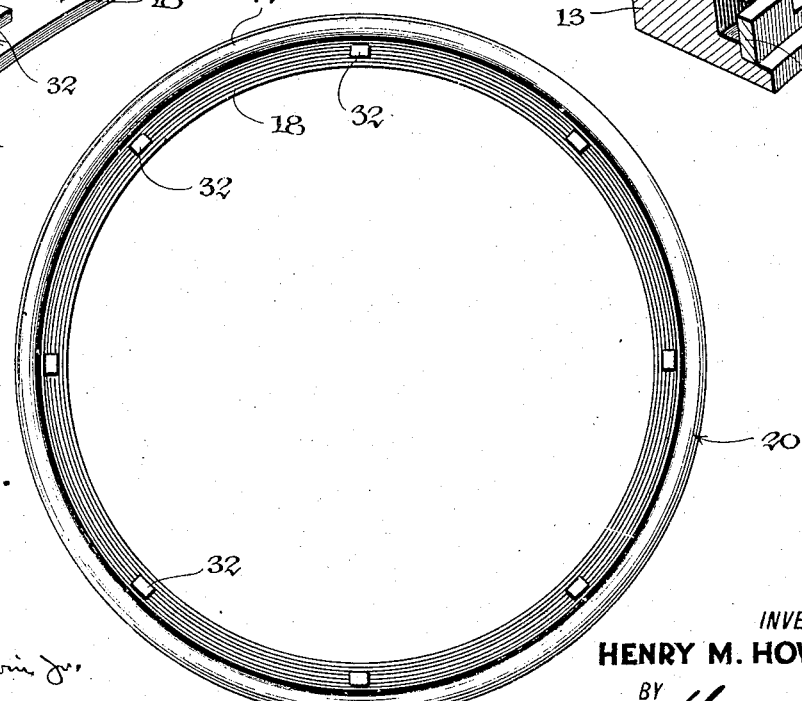
Figure 8 is a view in side elevation of the inside of the demountable rim.

Referring to the drawings wherein for the sake of illustration is shown the preferred embodiment of the invention, it will be seen that the reference character 10 designates generally a wheel. The wheel is shown as being of the wooden or artillery type but it is obvious that the invention may be embodied in any type of wheel and is well adapted for embodiment in a wire wheel or in a disk wheel after the manner shown in my application, Serial No. 483,923, filed July 11, 1921.

The wheel 10 comprises the hub 11, spokes 12, a felly 13 and a fixed rim or felly band 14 encircling the felly and secured thereto.

The fixed rim 14 is provided with a circumferential shoulder 16 extending around its inner marginal edge and beveled to constitute an abutment, and the periphery of the fixed rim 14 is inclined, as at 17, to provide a seat. At its outer marginal edge, the fixed rim is provided with a depending flange or locking plate 18, the felly 13 being cut away to accommodate this flange or locking plate.

An automobile rim, designated generally at 20, is provided and includes a base section 21, an inner fixed tire retaining flange 22 and an outer removable tire retaining flange 23. On the underside of the base section 21 ridges 24 and 25 are provided and engage the inclined seat 17 to support the demountable rim in position on the fixed rim.

A locking plate 26 is integrally formed with or otherwise secured to the base section of the demountable rim and a cooperating locking plate 27 is integrally formed with the outer tire retaining flange 23 and in the assembly locking plates 26 and 27 abut. Spaced arcuate locking flanges 28 having enlarged heads 28ª are carried by the locking plate 26, and in the assembly are received in an annular channel 29 provided in the locking plate 27 and having arcuate shoulders 30 spaced circumferentially to provide for the entrance of the enlarged heads of the locking flanges 28 into the channel and spaced circumferentially to accommodate the locking flanges when the outer locking plate 27 has been moved circumferentially with respect to the inner plate 26 so as to confine the enlarged heads behind the locking shoulders 30.

Cooperating means on the flange 18 and the locking plate 26 is provided for releasably securing the demountable rim in position on the fixed rim of the wheel and comprises a plurality of spaced T-shaped locking lugs 32 integrally formed with or otherwise secured to the inner periphery of the locking plate 26 and cooperable with seats or sockets, designated generally at 33 and provided therefor in the flange 18 of the fixed rim. Each of these sockets includes an entering opening 34 and locking shoulders 35 with which the locking lugs 32 engage. The felly 13 is cut away or suitably formed to accommodate the locking lugs 32.

Means is provided for preventing circumferential movement of the demountable rim on the fixed rim and comprises a bolt and nut 35 extending through alined openings provided therefor in the plates 18, 26 and 27, and through a suitable opening in the felly, the opening of the felly having a flanged bushing 36 inserted therein to take up wear and to give added strength and rigidity to this securing means.

A tire, designated at 40, is arranged on the demountable rim. The tire may be mounted on the rim and demounted therefrom by simply removing the outer tire retaining flange 20 whereby the necessity of pinching beads of the tire over the tire retaining flanges is obviated. The demountable rim itself may be readily removed from the wheel by simply removing the bolt 35 and rotating the demountable rim relative to the fixed rim until the locking lugs 32 are alined with the entering openings 34 of the sockets 33, and then drawing the rim laterally from the wheel. It is obvious that the rim is reversely moved in placing it in position on the fixed rim.

Suitable slots 45 are provided, and are adapted to cooperate with an operating tool to facilitate manipulation of the demountable rim.

I claim:

In a device of the character described, a wheel having a fixed rim provided with an annular locking plate, a demountable rim associated with the fixed rim and including an annular locking plate adapted to come into face to face engagement with the locking plate of the fixed rim in assembly and cooperating means between the annular locking plate of the fixed rim and the locking plate of the demountable rim for releasably securing the demountable rim on the fixed rim, said cooperating means including spaced T-shaped locking lugs carried by the locking plate of the demountable rim, the locking plate of the fixed rim having sockets provided with locking shoulders cooperable with said locking lugs.

HENRY M. HOWELL.